July 21, 1959     C. B. SIZEMORE ET AL     2,896,039
BIN-LEVEL SENSING DEVICE
Filed July 17, 1957
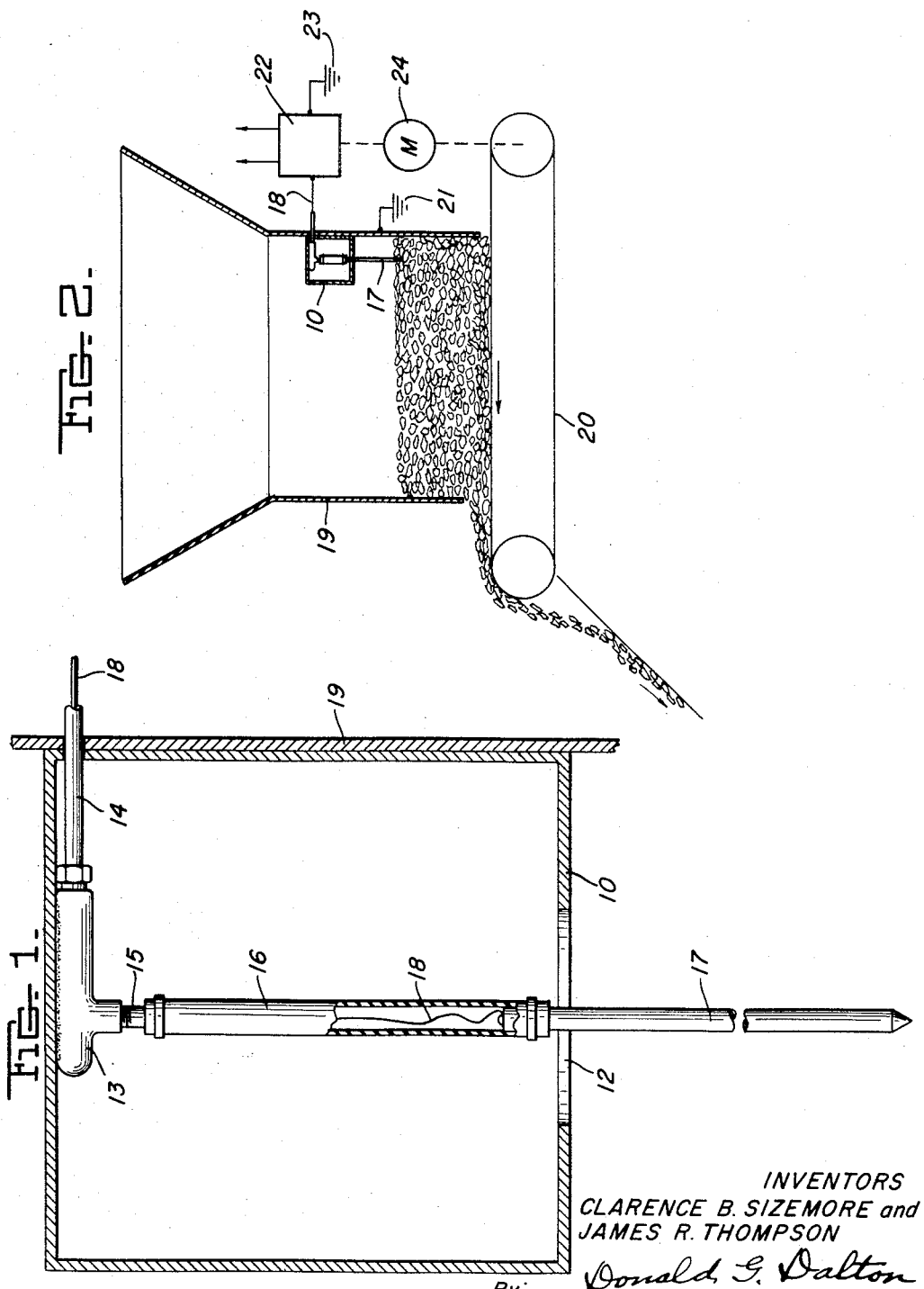
INVENTORS
CLARENCE B. SIZEMORE and
JAMES R. THOMPSON
By: *Donald G. Dalton*
                Attorney

2,896,039
BIN-LEVEL SENSING DEVICE

Clarence B. Sizemore and James R. Thompson, Birmingham, Ala., assignors to United States Steel Corporation, a corporation of New Jersey Application July 17, 1957, Serial No. 672,408

4 Claims. (Cl. 200—61.21)

This invention relates to an improved sensing device useful for gauging the level of electrically conductive material in a bin or the like.

An object of the invention is to provide an improved electrically operated sensing device which avoids mechanically movable switch arms subject to damage from moisture, dust or chunks of material falling thereagainst.

A further object is to provide an improved sensing device which relies on electrical conductivity of the material and which includes a flexibly mounted probe adapted to contact the material yet fully protected against the damage from such contact.

A more specific object is to provide an improved sensing device which includes a contact probe, a flexible hose mounting said probe so that it can yield in response to impact, and a protective housing for said hose.

In accomplishing these and other objects of the invention, we have provided improved details of structure, a preferred form of which is shown in the accompanying drawing, in which:

Figure 1 is a vertical sectional view of our sensing device; and

Figure 2 is a diagrammatic vertical sectional view illustrating an installation of our sensing device on an ore bin and apron feeder.

Our sensing device includes a metal housing 10 which has an opening 12 in its bottom wall. An elbow 13 is welded to the underface of the top wall of the housing and carries a pipe 14 projecting from its horizontal segment through a side wall of the housing and a pipe nipple 15 projecting downwardly from its vertical segment. A flexible hose 16 of rubber or the equivalent is fixed to the nipple 15 and extends downwardly approximately to the bottom of the housing, but terminates above the bottom. An elongated electrically conductive probe 17, preferably formed from a steel rod, is fixed to the lower end of the hose and extends downwardly therefrom through the opening 12. An electrical conductor 18 extends through pipe 14, elbow 13, nipple 15 and hose 16 and is fixed to the upper end of probe 17. The conductor is of course insulated from the pipe, elbow and nipple.

Figure 2 illustrates diagrammatically and not to scale a typical installation of our sensing device for gauging the level of ore in a bin 19 which discharges to an apron feeder 20. The ore can be any which is electrically conductive, such as iron ore. In this installation the level of ore in the bin should be at least a foot or so above the apron feeder to furnish a cushion over the feeder and prevent damage thereto from the impact of falling ore charged to the bin. The housing 10 is fixed to the inside of one of the bin walls at a height which locates the bottom of the probe 17 at the desired minimum ore level. As long as ore is at least up to this level, it remains in electric contact with the probe, but if the ore drops below this level it loses contact. The bin, and hence the ore therein, are electrically grounded as indicated at 21. The conductor 18 extends to a suitable control circuit 22 also electrically grounded as indicated at 23. This circuit controls operation of a motor 24 which drives the apron feeder 20, whereby the feeder runs only when the probe contacts ore in the bin. If the probe loses contact, the current path through ground is broken and the circuit stops the motor. The circuit is not shown in detail, since conventional circuits for this purpose are well known.

Since the probe is flexibly mounted, it can yield when struck by ore chunks or the like and is not damaged. The housing over the flexible mounting fully protects the mounting against damage from impact. The installation illustrated is of course only one example of a way of using the device, which has general utility wherever it is desired to gauge the level of a conductive material in a bin or the like. Other examples would be to actuate equipment which regulates ore feed to a bin to maintain the level between preset points; to move a mechanical device feeding ore to a bin when the bin is full; or to allow remote monitoring of the level of material in a bin.

While we have shown and described only a single embodiment of the invention, it is apparent that modifications may arise. Therefore, we do not wish to be limited to the disclosure set forth but only by the scope of the appended claims.

We claim:

1. A sensing device comprising a housing having an opening in its underside, a downwardly extending tubular flexible element of insulating material fixed at its upper end within said housing and terminating with its lower end above the underside of the housing, an elongated electrically conductive probe fixed at its upper end to the lower end of said flexible element and extending downwardly through said opening, and an electric conductor extending from outside said housing, through said flexible element and connected to the upper end of said probe.

2. A sensing device comprising a housing having an opening in its underside, a tubular fixture within said housing, a flexible rubber hose fixed at its upper end to said fixture and extending downwardly and terminating with its lower end above the underside of the housing, an elongated electrically conductive probe fixed at its upper end to the lower end of said hose and extending downwardly through said opening, and an electric conductor extending from outside said housing through said fixture and hose and connected to the upper end of said probe.

3. A sensing device comprising a housing having an opening in its underside, an elbow fixed to the underface of the top of said housing, a pipe extending from said elbow to the exterior of said housing, a flexible rubber hose fixed at its upper end to said elbow and extending downwardly therefrom but terminating within the housing, an electrically conductive probe fixed at its upper end to the lower end of said hose and extending downwardly through said opening, and an electric conductor extending from outside said housing through said pipe, elbow and hose and connected to the upper end of said probe.

4. The combination, with a bin adapted to receive electrically conductive material, of a sensing device for gauging the level of material in the bin comprising a housing fixed to the inside of the bin and having an opening in its underside, a downwardly extending tubular flexible element of insulating material fixed at its upper end within said housing and terminating with its lower end above the underside of the housing, an elongated electrically conductive probe fixed at its upper end to the lower end of said flexible element and extending downwardly through said opening to contact material in the bin if the level of the material is sufficiently high, and an electric conductor extending from outside said bin and through said housing and flexible element and connected to the upper end of said probe.

References Cited in the file of this patent

UNITED STATES PATENTS

| | | |
|---|---|---|
| 2,494,819 | Lane | Jan. 17, 1950 |
| 2,774,959 | Edelman | Dec. 18, 1956 |

FOREIGN PATENTS

| | | |
|---|---|---|
| 734,724 | Great Britain | Aug. 3, 1955 |
| 865,065 | Germany | June 5, 1953 |